(No Model.)

J. P. DAVIS & G. B. HARWELL.
FLOUR BIN AND SIFTER.

No. 484,780. Patented Oct. 25, 1892.

Witnesses
Chas. A. Toxx
N. J. Riley

Inventors.
J. P. Davis
G. B. Harwell.
By their Attorneys,
C. A. Snow & Co.

UNITED STATES PATENT OFFICE.

JEPTHA P. DAVIS AND GEORGE B. HARWELL, OF MANSFIELD, ARKANSAS.

FLOUR BIN AND SIFTER.

SPECIFICATION forming part of Letters Patent No. 484,780, dated October 25, 1892.

Application filed April 5, 1892. Serial No. 427,892. (No model.)

*To all whom it may concern:*

Be it known that we JEPTHA P. DAVIS and GEORGE B. HARWELL, citizens of the United States, residing at Mansfield, in the county of Sebastian and State of Arkansas, have invented a new and useful Flour Bin and Sifter, of which the following is a specification.

The invention relates to improvements in flour bins and sifters.

The object of the present invention is to simplify and improve the construction of bins and sifters, more especially the agitator, and to enable the parts to be readily removed for cleaning and other purposes.

The invention consists in the construction and novel combination and arrangement of parts hereinafter fully described, illustrated in the accompanying drawings, and pointed out in the claim hereto appended.

Figure 1:
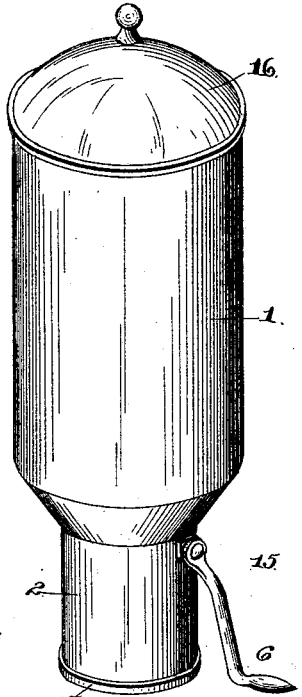
Figures 2, 3, 4, 5:
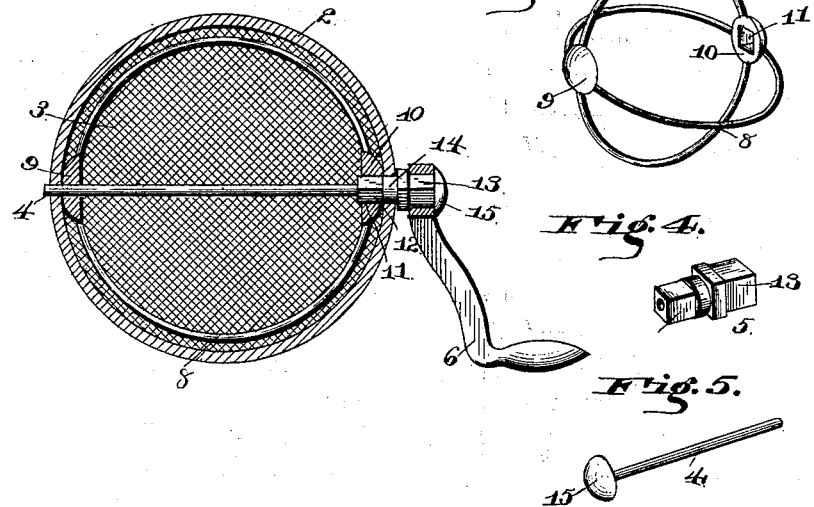

In the drawings, Figure 1 is a vertical sectional view of a combined bin and sifter constructed in accordance with this invention. Fig. 2 is a horizontal sectional view. Fig. 3 is a detail perspective view of the agitator. Fig. 4 is a similar view of the sleeve. Fig. 5 is a detail perspective view of the removable shaft.

Like numerals of reference indicate corresponding parts in all the figures of the drawings.

1 designates a bin-casing having a lower contracted portion 2, in which is arranged a sifter 3 and which is provided with bearings for a removable shaft 4 and a sleeve 5 arranged on the shaft and adapted to connect a crank-handle 6 with an agitator 7. The agitator is composed of curved wires 8 and disks 9 and 10, to which the ends of the curved wires are secured. It is mounted on the removable shaft 4, and the disk 9 is provided with a circular opening to receive the shaft, while the disk 10 has a rectangular opening 11 to receive a squared portion 12 of the sleeve. The sleeve has an inner squared portion 12 to fit in the rectangular opening of the agitator. It has an outer squared portion 13 to receive the crank-handle 6, and it has an intermediate rounded portion 14, which is journaled in the casing. The crank-handle is provided with a rectangular opening to receive the outer squared portion of the sleeve, and it is held on the same by the shaft, which is provided with a head 15. The sleeve 5, which is loosely mounted on the shaft, rigidly connects the crank-handle with the agitator and the latter is rotated as the handle is turned. This construction permits the agitator to be readily removed from the casing and to be easily replaced therein. The upper end of the casing is closed by a cover 16, and the lower end thereof is provided with a removable bottom 17.

It will be seen that the combined bin and sifter is simple and comparatively inexpensive in construction and that the parts may be readily removed and replaced.

What we claim is—

The combination of a casing provided with opposite cylindrical bearings, a sifter arranged in the bottom of the casing, a sleeve mounted in one of the bearings and provided at its inner end with a polygonal portion and at its outer end with a polygonal portion and having an intermediate rounded portion journaled in the said bearing, a crank-handle having a polygonal opening and removably mounted on the outer polygonal portion of the sleeve, a cylindrical shaft passed removably through the sleeve and having its opposite end terminating in the adjacent bearing of the casing and provided at the other end beyond the sleeve with a head larger than the sleeve and securing the handle thereon, and the rotary agitator-frame provided at its axis with opposite openings, one of which is cylindrical to receive the shaft and the other of which is polygonal and removably receives the inner end of the sleeve, substantially as described.

In testimony that we claim the foregoing as our own we have hereto affixed our signatures in the presence of two witnesses.

JEPTHA P. DAVIS.
GEORGE B. HARWELL.

Witnesses:
JOHN T. DAVIS,
A. C. BREWSTER.